Figure 1:
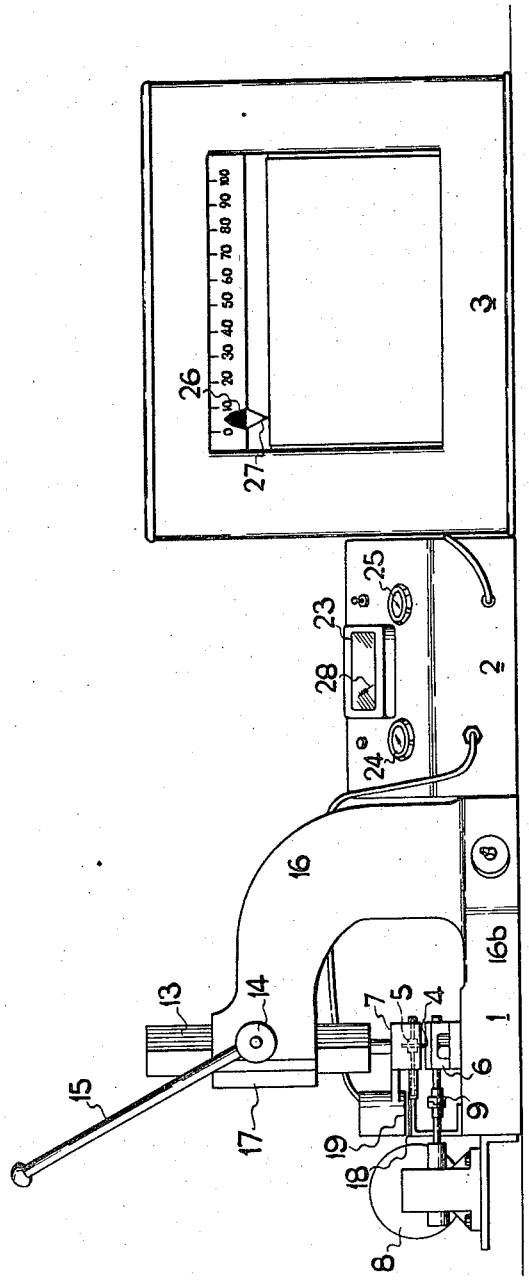

March 24, 1959   G. R. DONALDSON   2,878,570
APPARATUS FOR CONTINUOUS MEASUREMENT OF BASIS WEIGHT
OF PAPER, BOARD OR LIKE FIBROUS MATERIAL
Filed May 8, 1956   3 Sheets-Sheet 1

INVENTOR
GODFREY ROBERT DONALDSON
BY Young, Emery T Thompson
ATTYS.

March 24, 1959  G. R. DONALDSON  2,878,570
APPARATUS FOR CONTINUOUS MEASUREMENT OF BASIS WEIGHT
OF PAPER, BOARD OR LIKE FIBROUS MATERIAL
Filed May 8, 1956  3 Sheets-Sheet 2
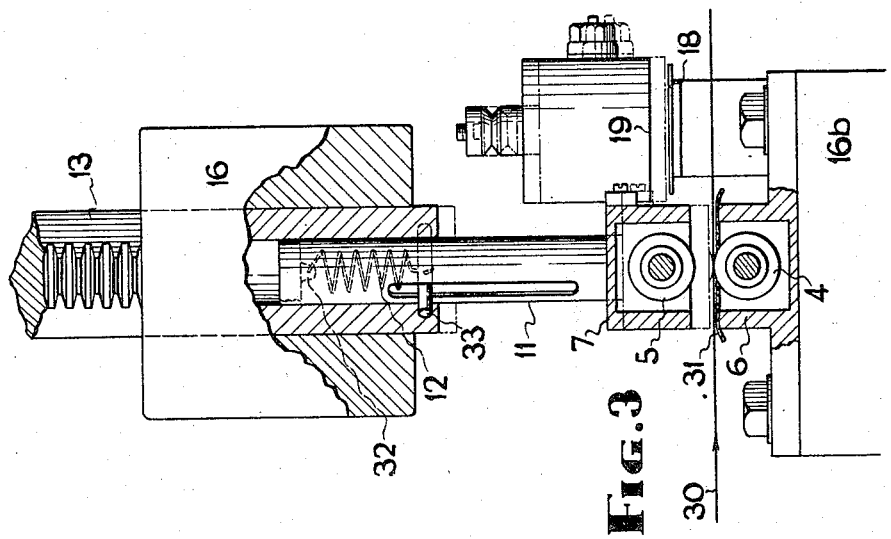
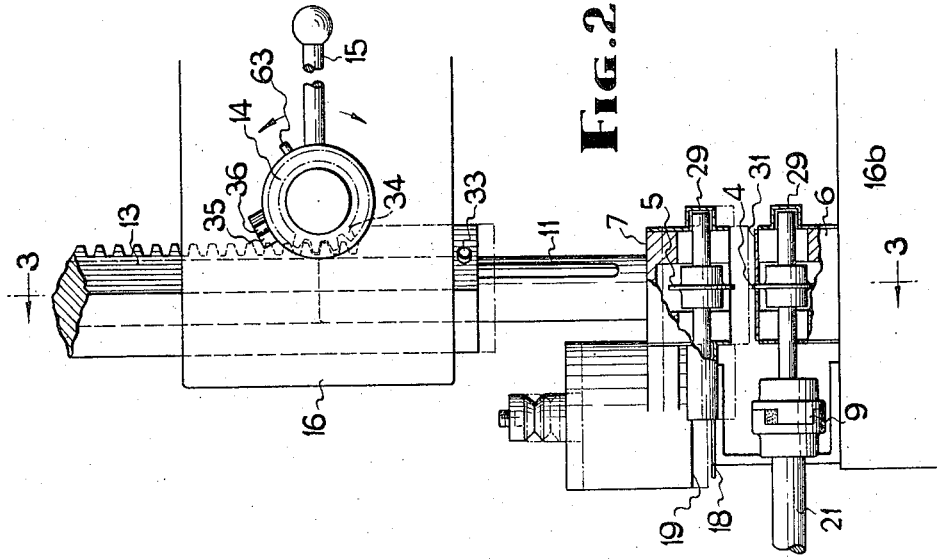
INVENTOR
GODFREY ROBERT DONALDSON
By Young, Emery & Thompson
ATTYS.

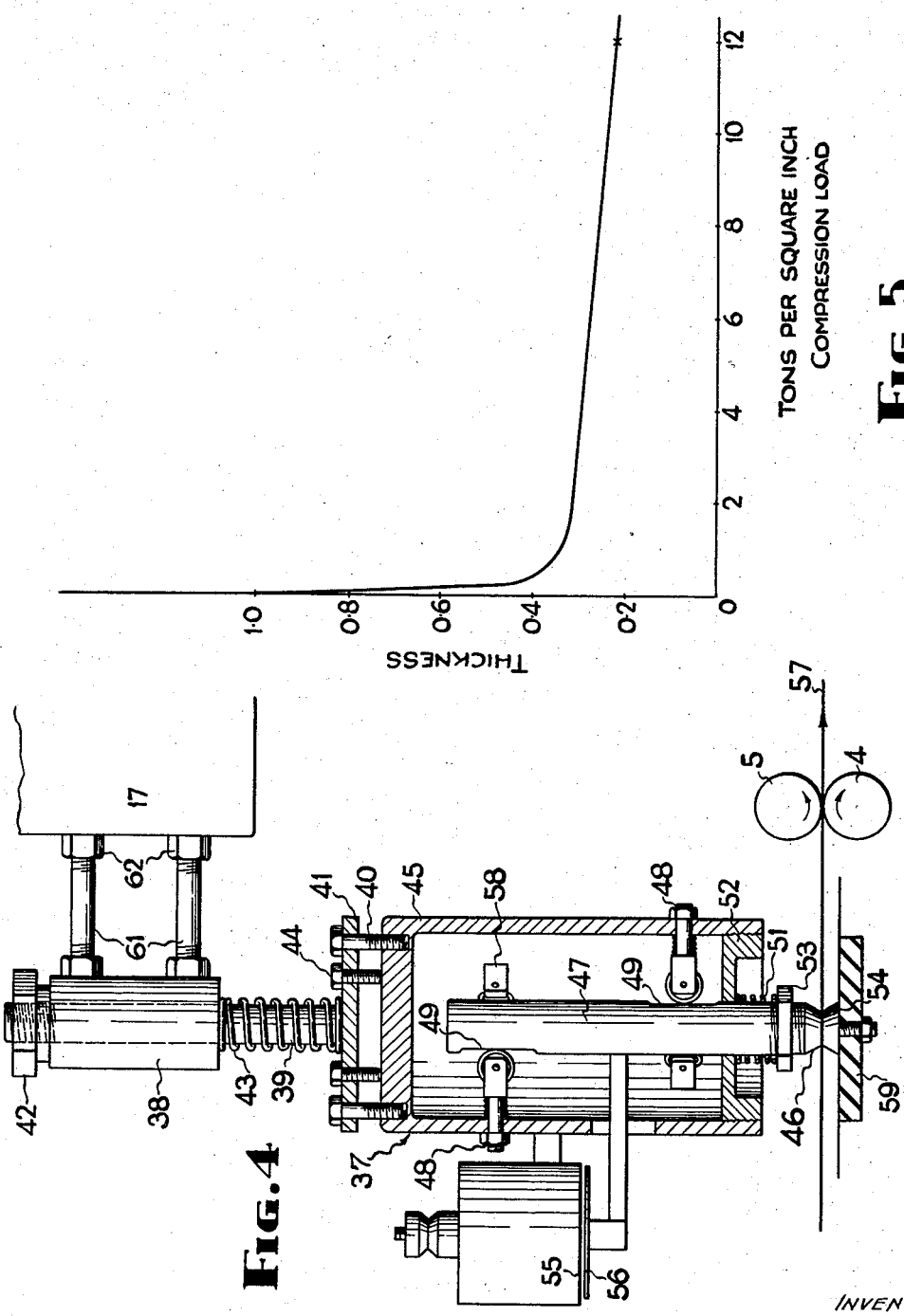

United States Patent Office 2,878,570
Patented Mar. 24, 1959

2,878,570

APPARATUS FOR CONTINUOUS MEASUREMENT OF BASIS WEIGHT OF PAPER, BOARD OR LIKE FIBROUS MATERIAL

Godfrey Robert Donaldson, Canterbury, Victoria, Australia, assignor to Australian Paper Manufacturers Limited, South Melbourne, Victoria, Australia, a company of New South Wales Application May 8, 1956, Serial No. 583,390

Claims priority, application Australia May 12, 1955

6 Claims. (Cl. 33—147)

This invention relates to apparatus for continuous measurement of basis weight of paper, board or like fibrous material.

The "basis weight" or "substance" of paper or board is the weight of a specified area of sheet of the paper or board. The area specified is usually large compared with the area of the sample sheet which is actually weighed to determine basis weight. For example, basis weight of wrapping paper may be specified as a certain weight, in lbs., of 480 sheets, i.e. a ream, each sheet measuring 20 x 30 inches i.e. a double crown size sheet e.g. 36 lbs. double crown; but the sample which is actually weighed may measure 20 x 30 inches or considerably less.

The basis weight of paper is not exactly uniform over a large area of paper but varies either progressively across the width of a large sheet or from light to heavy and back again in a somewhat rhythmical fashion along the length of a large sheet or in a random fashion. The variation is usually a combination of all three and is recognised by both paper maker and paper merchant as being inevitable in the paper industry. There is a "trade tolerance" which is rather loosely described as "plus or minus 5%" and indicates what degree of variation in basis weight is to be considered reasonable in a consignment of paper or board.

The basis weight of paper includes the weight of any water which is contained in or combined with the paper at the time of weighing. This water is not apparent and paper that is commonly spoken of as "quite dry" nevertheless contains water. The percentage by weight of water in the sheet depends upon the temperature and humidity of the air in which the paper has been stored. Paper can, if given sufficient time, absorb from moisture laden air and lose again in dry air as much as five or six percent of water by weight.

In order to avoid confusion a standard method of determining basis weight has been laid down by testing authorities in the paper industries throughout the world. This method requires an atmosphere of controlled temperature and humidity in which the paper samples are stored to "condition" them until they have ceased to gain or lose water. The samples are weighed in the same atmosphere and the "conditioned basis weight" is reported. This is an accurate measure of basis weight.

It is not usually practicable to condition a large tonnage of paper and therefore, the average conditioned basis weight can only be calculated from the results of tests of samples—e.g. tests for conditioned basis weight or moisture content. The reliability of the calculated figure depends upon the size of the sample and the basis weight variations of the paper.

The average basis weight of a large tonnage of paper is important to a converter as it indicates how many articles, such as bags, can be made from the consignment and yet if the paper is variable the cost of adequately sampling and testing a consignment is prohibitive. Therefore, it is an advantage to make paper of uniform basis weight because it permits more accurate planning of operations.

If the basis weight varies excessively it may cause a converting machine, which is making, for example, paper bags from a reel of paper, to operate in an unsatisfactory manner. The bag machine may jam and stop frequently or in some other way increase the cost of bags, or the bags may be creased resulting in products of a low standard of quality.

For reasons such as those described above there has been a need in the paper manufacturing industry for a considerable period for some means of measuring basis weight continuously. A continuous measurement and recording of basis weight would, in effect, permit more adequate sampling and testing at low cost.

Early attempts to measure thickness and estimate from thickness the basis weight were satisfactory only on rare occasions. Usually it is found that the density of the sheet of paper or board is so variable that large errors in basis weight result.

A more recent method employs a radioactive material and an electronic device. Beta rays from the radioactive material are directed on to the sheet of paper and the intensity of the rays which pass right through is roughly inversely proportional to basis weight and is measured by the electronic device which then records the basis weight. This type of basis weight "gage" is used in two ways (1) to measure basis weight as the paper travels through the paper machine and to show up and help control the variations, of both a rhythmical and random nature, which occur as a result of the paper making process; (2) to measure basis weight along the length of sample strips taken from the ends of the rolls of paper after they come from the paper machine. This is called a basis weight "profiler" as it records the profile or shape of the graph showing the basis weight variation across the width of the paper machine, i.e. from one side of the web of paper to the other. It is usual for a beta ray type of basis weight profiler to measure "off machine basis weight" that is it measures the weight of both the paper and whatever water content it has as it comes off the machine. The sample strip can however, be conditioned for a period in a standard atmosphere in order to obtain a "conditioned basis weight profile," but this necessitates waiting for that period before the result of the test can be obtained.

As indicated above, the water content in the sample affects directly the reading of this type of profiler so that an increase in water content results in a corresponding increase in the value of the basis weight shown on the graph. For example, if the water content increases from 5% to 6% along the sample strip the basis weight shown on the graph will increase by 1% due to this cause.

If a profiler is used to show the changes in basis weight across the width of the web of paper as a guide to the degree of uniformity in the distribution of pulp across the width of the paper machine it is an advantage to be able to graph the basis weight without including moisture content.

The present invention is based on the discovery that the basis weight of paper, board or like fibrous material may be determined with reasonable accuracy by using the thickness of an adequately compressed sample strip of the fibrous material. When paper is subjected to high pressure such as that exerted when the paper is passed through the nip of two rollers, all the occluded air, that is the air normally held within the cellulose fibre web, is expelled and compressed cellulose is formed. The compressed fibrous material has a substantially uniform density and does not flow sideways under the pressures envisaged in the practice of the present invention. Thus, it has been found that through a wide range of pressures, basis weight of paper and like fibrous material is proportional to its thickness when said pressures are such that the compressed material has a substantially constant density. It is possible that different papers and boards may all have identical compressed thickness and yet the basis weight values in each case will not be exactly the same. This difference is due to differences in "furnish." However, a series of compressed thickness readings on the one sheet will all be proportional to the basis weight at the point of measurement and will not be noticeably affected by factors such as the moisture content.

Cellulose, which is the principal component of paper, becomes a hard brittle material under a compression load and fails by breaking up under shear of 45° to its surface if the load reaches say about twelve tons per square inch. At a load of approximately six tons per square inch its thickness varies comparatively little with variations in this pressure and yet there is no risk of failure of the material. Paper so treated is translucent and is appreciably thinner than the rest of the paper, but this treated area is not broken nor is it wrinkled to any appreciable degree with respect to the remainder of the paper sheet which indicates that the cellulosic material does not flow. If a pressure appreciably less than approximately six tons per square inch is used then the likelihood of variations in thickness due to variations in density would be greater until at about one ton per square inch a variation in density of 100 percent could result from a small variation in load.

The primary object of the present invention is to provide means for the continuous measurement of basis weight of paper, board or like fibrous material, said means producing results which are substantially independent of the various factors, such for example as moisture content, which seriously affect the results obtained by known apparatus used for the periodic determination of basis weight.

A further object is the provision of an apparatus, the design of which is sufficiently flexible to permit adaptation thereof to produce results indicating a particular form of basis weight variations as hereinafter described.

Another object of the invention is the provision of an apparatus for the simultaneous measurement of basis weight and thickness of paper, board or like fibrous material.

Yet another object is to provide an apparatus for the purpose previously mentioned which may be adapted to supply permanently recorded results, such as for example, by use of a graph. In the case of a graph which may be in strip form, the form of the graph may be varied at will to indicate particular aspects of the basis weight. Further, graphically recorded results are desired which may be set out in such a manner that they may be readily converted to and expressed in any units normally used in the art.

A still further object is to provide an apparatus for use in the continuous measurement of basis weight of paper, board or like fibrous material comprising means to compress said fibrous material to a substantially constant density together with means for measuring the thickness of the compressed fibrous material.

In a preferred form of the invention, the means for compressing the fibrous sheet material to a substantially constant density comprise two rotatable discs urged in frictional driving contact at their circumferences and adapted to receive the fibrous material therebetween, one or both discs being driven.

The invention will now be described with greater particularity, reference being made to the drawings in which—

Figure 1 illustrates a preferred embodiment of the invention,

Figure 2 is a front elevational view of the mechanical portion of the preferred embodiment shown in Figure 1, with portions broken away for convenience of illustration, Figure 3 is a sectional view along line 3—3 of Figure 2, Figure 4 is a view of the preferred form of the invention for use in the simultaneous measurement of basis weight and thickness of paper or like material, and Figure 5 is a graph illustrating the relationship between thickness of the fibrous material and the pressure applied thereto.

Referring firstly to Figure 1, the apparatus illustrated comprises three distinct integers, means for compressing the fibrous material 1, hereinafter referred to as a profiler, a proximity meter 2 and an electrical recorder 3. In the profiler two discs 4 and 5 are mounted in bearing blocks 6 and 7, the disc mounted in the lower and rigidly positioned bearing block 6 being driven by electric motor 8 through coupling 9, which ensures the application of a pure torque to said lower disc. The disc mounted in the upper bearing block 7 is free to rotate and may be lowered into frictional driving contact with said lower disc by means of a sliding tube 11 encasing a spring 12 which applies a load to said upper disc when in said lowered operational position. Sliding tube 11 is raised or lowered by means of a rack incorporated in sliding and hollow block 13 and a pinion incorporated in shaft 14. Shaft 14 and associated pinion are manually operated by means of handle 15.

A spring is used in preference to weights as this is found to result in a more reliable feeding of the strip through the discs and a more sensitive response to transient changes in thickness. Further a spring permits a much faster rotation of the discs and therefore a shorter time for testing a strip of paper.

The upper disc, its bearing block and associated releasing and load supplying means are fitted to the upper portion of yoke 16 by means of plate 17. The lower half 16b of yoke 16 rigidly supports the lower disc bearing block 6, the lower plate 18 of a condenser, the electric motor 8 and associated drive 21 and coupling 9.

The upper moveable plate 19 of the condenser is rigidly attached to and free to move with upper bearing block 7 and is positioned directly above lower plate 18. A lead from the upper plate connects with proximity meter 2 which is essentially a capacity bridge associated with an amplifier and milliammeter having a scale 23. The proximity meter shown is of the Fielden type. Control 24 is a zero adjustment which enables a zero reading to be obtained when the two discs are in contact with each other without any paper therebetween. The second control 25 is a sensitivity adjustment which enables the meter reading to be adjusted when a sample of paper is between the discs. In practice, it has been found convenient to adjust the reading to the middle of the scale. After adjustment, zero on the meter scale represents zero basis weight, mid scale represents 100% of nominal basis weight and a full scale deflection represents 200% nominal basis weight.

A permanent record of the basis weight measurements in the form of a graph or chart is obtained by use of a strip chart recorder which is connected in series with the milliammeter of the proximity meter 2 and the movement of pin 26 and associated pen 27 corresponds to the movement of pointer 28 of the milliammeter.

It is preferred that the chart has 200 lines from zero point to full scale so that each one of these lines represents a 1% change in basis weight. It is found convenient to use this system of measurement when testing a variety of papers and boards covering a wide range of different basis weights. There is no need to mark the various charts with the calibration of the instrument in terms of actual basis weight in pounds per ream of double crown sized sheets. Every chart can be interpreted immediately because each line from the centre of a chart represents 1% of the basis weight of the material tested irrespective of its basis weight. This method of representing variations in basis weight is convenient because it relates to the trade tolerance of 5% and enables the variations to be viewed with an appropriate and uniform sense of proportion.

The chart speed of the strip recorder can be adjusted to give a long or short graph for any given length of sample strip. A short graph crowds the small variations in basis weight together and highlights the major variations or general trends; in this case the strip chart speed is slow. A higher chart speed will result in a long graph on which every small change in basis weight can be easily distinguished.

Figure 2 shows the profiler in greater detail. Each of discs 4 and 5 is rigidly connected to a shaft passing perpendicularly through its centre and said shaft is supported on each side of the disc by V bearings (not shown) which accurately centre the shaft when under load. Said shafts are positioned when inoperative, in the case of the upper disc, by bosses 29 on each side of the bearing block and in the case of the lower shaft, on one side by the drive from the gear housing of the electric motor 8 and on the other side by boss 29. Plate 31 of the lower bearing block 6 ensures that the paper 30 is drawn smoothly between the discs and its movement is not hindered by projections on the lower bearing block.

The measurement of thickness must be carried out accurately if variations in basis weight of the order of 1% are to be detected. For example, thin papers compress to a thickness of the order of one thousandth of an inch and 1% of this is 0.00001 inch. This is an extreme case and for thick papers and boards a lesser accuracy will suffice but the design of the present instrument is aimed at the extreme requirement.

In practice, when accuracy of the above-mentioned order is required, discs 4 and 5 are accurately ground and are free from eccentricity. When mounted, they rotate within the V bearings without side play and end play is reduced to a minimum by the bosses. The discs illustrated are made from hardened steel and have a diameter of approximately 1¼" with a plain fixed axle. The circumferential width of the wheel is about 0.05". With these discs, a load of approximately 40 lbs. is exerted by spring 12 to give a nip pressure of approximately six tons per square inch.

Figure 2 in association with Figure 3 illustrates the method of raising and lowering upper disc 5 and applying load to same. Sliding tube 11 is free to move within hollow and moveable rack block 13 in the vertical plane only. The upper end of said tube is sealed and provided with a lug 32 for attachment of the upper end of loading spring 12. Pin 33, rigidly attached to rack block 13 forms the lower anchor for the spring.

When a test sample of paper, board or the like has been placed between the discs, handle 15 is operated in an anti-clockwise direction and in turn actuates rack 13 through pinion 34.

Both the rack block 13 and sliding tube 11 move downward simultaneously being associated through pin 33 and spring 12, until the upper disc rests on the lower disc. With further movement of handle 15 spring 12 is expanded until spring loaded catch pin 63 hits the striking plate 35. Once the pin has engaged groove 36 in the striking plate, the desired load is applied to the discs.

Figure 4 illustrates the use of thickness measuring device 37 in association with the profiler in order that the thickness of the paper board, in its off the machine condition, and its basis weight may be determined simultaneously. The thickness measuring device is adjustably mounted by means of studs 61 and associated locking nuts 62 to plate 17 of the profiler in order that the thickness measuring feet or anvils present perfectly horizontal and parallel faces to the paper or board test piece. The upper block 38 of this device has a shaft 39 passing centrally therethrough which has a circular plate 41 rigidly attached to its lower end and which is threaded on its upper end to receive a wing or knurled nut 42. A compression spring 43 is held between plate 41 and the lower end of the block to allow adjustment of the height of the upper portion of the device using adjustment nut 42.

Further adjustment of the position of the device is provided by three screws 40, each with an associated locking screw 44, and engaging with threaded holes in the upper portion of cylindrical housing 45.

Said cylindrical housing incorporates the shaft 47 of moveable foot 46 which should move substantially without friction in order to record accurately all variations in the thickness of the test piece. The foot shaft 47 is supported between two sets of ball races. Each set has two ball races 58 with supporting blocks rigidly attached to the cylindrical housing wall 120° apart, and an adjustable ball race 48 is positioned 120° from each of the last mentioned ball races.

Said adjustable ball race permit adjustment to ensure free movement of the foot shaft and yet eliminate any "play." Both adjustable ball races move on flats 49 machined into the foot shaft. The flats are provided to prevent rotation of the moveable foot due to the movement of the paper test sample between the feet.

The moveable foot is held in continuous contact with the paper sample by means of a light load of say two pounds applied by means of a compressing spring 51 held between annulus 52 screwed into the bottom of the cylindrical housing and nut 53, threaded onto said foot.

The lower foot 54 is rigidly positioned and may be attached to the bed plate of the basis weight measuring device. The supporting plate 59 of foot 54 is composed of insulating material, of suitable structural strength, in order that experiments may be performed with a view to determining the moisture content of the paper by an electrical method simultaneously with the determination of basis weight. The upper surface of foot 54, which contacts the lower surface of the paper test piece, is in the same horizontal plane as the uppermost point of lower disc 4. Thus errors are not introduced due to the paper sample being drawn obliquely between the feet of the thickness measuring device.

Both feet have their adjacent surfaces accurately ground in order to eliminate erroneous thickness readings produced by eccentricities in said surfaces.

In practice, the feet and the discs of the basis weight instrument are parted, the paper or board test piece 57 inserted and the feet and discs are each brought into operational contact. As the lower disc is driven the paper is drawn between the discs and the feet. In both cases the variations in thickness are determined by separate electrostatic measuring devices. As with the above described device for basis weight determination, the thickness measuring device incorporates a condenser, the first plate 55 of which is rigidly attached to and electrically insulated from the cylindrical housing and the second plate 56 positioned immediately below the first plate and attached to the foot shaft.

Figure 5 illustrates the relationship between the thickness of fibrous sheet material and the pressure applied thereto. It will be seen that a pressure of six tons per square inch on the material will compress same to a substantially constant density and also this optimum pressure lies approximately centrally between the undesirably small load, where thickness varies greatly, and the heavy load where failure occurs.

The invention is extremely useful and it can show with reasonable accuracy every variation in basis weight. Because the area of contact of the wheels is small the area tested for basis weight is small and variations in basis weight over a fraction of an inch can be easily shown up.

Such small variations are usually referred to under the heading of sheet formation rather than basis weight variation. Formation is said to be "wild" when a big difference occurs between adjacent small areas and is said to be "even" when the difference is small. The type of formation can be seen visually by holding a sheet of paper to the light and taking note of the variations in the light passing through the sheet. In the case of heavy papers or boards no light is transmitted and such a visual test is not possible. The appearance of the graph of the basis weight profiler according to this invention, however, provides a means of comparing the formation of heavy papers and a more sensitive method of gauging the formation of paper sheet.

The beta ray type of basis weight profiler tests an area of several square inches at a time and the resulting graph shows only the general trends or the effect of large variations and does not record formation. When only general trends of basis weight across the width of a web of paper as it is being made are required the novel apparatus of the present invention is not superior but it is definitely superior when greater detail of basis weight variation is required.

Besides variations in basis weight across the width of a paper or board machine, the paper maker is interested in variations in basis weight which affect the quality of the sheet with regard to various processes during its conversion into finished articles such as cartons or bags. For example, if the difference in basis weight between two small areas a few inches apart is too great, then there may be troubles on a printing press or on a machine for making multiwall bags. Because of the very small area tested by the invention profiler compared with a beta ray gauge type of profiler the novel instrument can be used for investigating a much greater range of variability problems. Some types of variation, i. e. those where the rate of change of basis weight is important or the width of a high or low basis weight area is small, cannot be measured accurately at all by the beta ray type of instrument.

The detailed variations can be averaged out when they are not required by running two or three sample strips through at the same time. If the sample strips are taken from adjacent layers on a large " machine roll" of paper they will be samples across the web, but several feet apart in the direction of the web, i.e. in the machine direction. The basis weight recorded on the graph at any instant will be the average of the basis weight at that position on the three sample strips and will represent only the general trend of basis weight across the width of the web.

In order to eliminate the detailed formation type of variations, wheels with a wider tread are used. These cover a wider track along the length of the sample and are too wide to penetrate to the bottom of small areas of very low basis weight.

The rapid movements of the pen of the recorder may be eliminated by use of a condenser or a resistance and condenser together in the electrical circuit connecting the proximity meter and the recorder. This causes a slower response of the pen and the graph reflects the general trend in basis weight, without showing the detailed variations.

As hereinbefore mentioned, apparatus according to this invention is substantially unaffected by factors such, for example, as moisture content. However, in some cases when the pulp used to make the paper is very well beaten the reading may be lower, but in any case the effect will only be approximately 1%. If a profiler is used to show the changes in basis weight across the width of the web of paper as a guide to the degree of uniformity in the distribution of pulp across the width of the paper machine, it is an advantage to be able to graph the basis weight without including moisture content.

It has been found that by reducing the load on the wheels to approximately one pound weight or less, the instrument draws a graph of thickness instead of basis weight. The thickness so measured is not exactly the same as thickness measured with standard paper testing micrometers because the foot pressure is higher, the anvils or feet are small and are not flat. However, the graph gives a very close approximation to a standard thickness graph obtained by plotting the readings of a micrometer. It is possible to wind the recorder chart back to the start of the basis weight graph and to draw the thickness graph alongside for comparison.

Having now described my invention, what I claim as new and desire to secure by Letters Patent is:

1. Apparatus for use in the continuous measurement of basis weight of paper, board or like fibrous material comprising two rotatable discs urged together in frictional driving contact at their circumferences, said discs compressing the fibrous sheet material passing therebetween to a substantially constant density under pressures of approximately six tons per square inch, a source of power for driving at least one of said discs, the width at their circumferences being substantially identical and the width of each disc being less than its diameter and means to determine the thickness of the compressed portion of said fibrous sheet material.

2. Apparatus for use in the continuous measurement of basis weight of paper, board or like fibrous sheet material comprising two rotatable discs urged in frictional driving contact at their circumferences by a load applied to one of said discs by means of a spring, the fibrous sheet material passing between said discs being compressed under pressures of approximately six tons per square inch, a source of power for driving at least one of said discs and means for determining the thickness of the compressed portion of said fibrous sheet material.

3. Apparatus for use in the continuous measurement of basis weight of paper, board or like fibrous sheet material comprising two rotatable discs urged in frictional driving contact at their peripheries by a load which produces a resultant pressure of approximately six tons per square inch at the point of contact between the discs, the fibrous sheet material passing between said discs being compressed under pressures of approximately six tons per square inch, a source of power for driving at least one of said discs and means to determine the thickness of the compressed portion of said fibrous sheet material, said thickness measurement being proportional to the basis weight of said material.

4. Apparatus for use in the continuous measurement of basis weight of paper, board or like fibrous sheet material comprising two rotatable discs urged in frictional driving contact at their circumferences, a source of power for driving at least one of said discs, the fibrous sheet material passing between said discs being compressed to substantially a constant density, one disc moving in the vertical plane in accordance with variations in the thickness of the compressed material, means for sequentially releasing a load on the last mentioned disc and separating said discs to facilitate removal and introduction of the fibrous sheet material and means for determining the thickness of the compressed portion of said fibrous sheet material, said thickness being proportional to the basis weight of said material.

5. Apparatus for use in the continuous measurement of basis weight of paper, board or like fibrous material comprising two rotatable discs urged in frictional driving contact at their circumferences, the fibrous material passing between said discs being compressed to a substantially constant density, one disc being driven by means of an electric motor, a coupling between the last mentioned disc and said motor for insuring the application of a pure torque to said disc and means to measure the thickness of the compressed portion of the fibrous material.

6. Apparatus for use in the continuous measurement of basis weight of paper, board or like fibrous sheet material comprising two rotatable discs urged in frictional driving contact at their periphery, supporting means for each disc, one disc being loaded by means of a spring, the load at the point of contact between the discs being approximately six tons per square inch and this pressure acting directly on the fibrous sheet material passing between said discs, and an electro-static measuring device comprising a capacity bridge, amplifier and milliammeter associated with a condenser the plates of which are each connected to one of the disc supporting means and one is earthed, the relative movement of the discs resulting from variations in the thickness of the compressed material varying the distance between the plates and producing a current value above or below the equilibrium value of the bridge circuit and means for permanently recording the variations in current flow.

References Cited in the file of this patent

UNITED STATES PATENTS

| | | |
|---|---|---|
| 549,444 | Dailey | Nov. 5, 1895 |
| 2,299,997 | Ladrach | Oct. 27, 1942 |
| 2,387,496 | Cornelius | Oct. 23, 1945 |
| 2,510,822 | Jacot et al. | June 6, 1950 |

FOREIGN PATENTS

| | | |
|---|---|---|
| 625,449 | Germany | Feb. 8, 1936 |
| 656,135 | Great Britain | Aug. 15, 1951 |